United States Patent

[11] 3,609,032

[72] Inventors Toshio Watanabe
 Tokyo;
 Shigeru Suzuki, Yokohama, both of Japan
[21] Appl. No. 795,317
[22] Filed Jan. 30, 1969
[45] Patented Sept. 28, 1971
[73] Assignee Kabushiki Kaisha Ricoh
 Tokyo, Japan
[32] Priority Jan. 31, 1968
[33] Japan
[31] 43/6375 and 43/6376

[54] DEVICE FOR LIMITING MOVEMENT RANGE OF A MOVABLE EXPOSURE MEANS IN A COPYING MACHINE
 3 Claims, 4 Drawing Figs.
[52] U.S. Cl. .................................................. 355/25,
 355/66, 355/75
[51] Int. Cl. .................................................. G03b 27/50,
 G03b 27/70

[50] Field of Search .......................................... 355/8, 25,
 51, 64–66, 75

[56] References Cited
 UNITED STATES PATENTS
 3,421,816 1/1969 Robertson et al............. 355/8

Primary Examiner—Samuel S. Matthews
Assistant Examiner—Richard A. Wintercorn
Attorney—Burgess, Ryan & Hicks ABSTRACT: A device for limiting the movement of a reciprocable exposure unit in a copying machine including a manual setting for a positioning element corresponding to the size of the copy sheet. A collidable element on the exposure unit moves to contact the positioning element thereby actuating a microswitch to reverse the movement of the exposure unit. The collidable element includes a spring-biased pivotal portion that makes the movable contact and is rotatably movable from one side to the other side of the collidable element.

PATENTED SEP28 1971   3,609,032
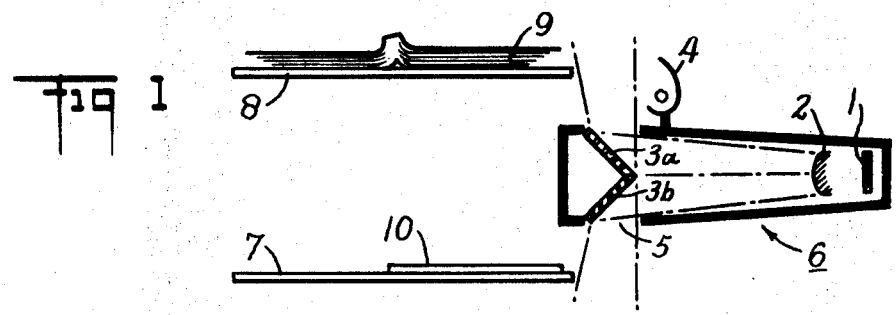
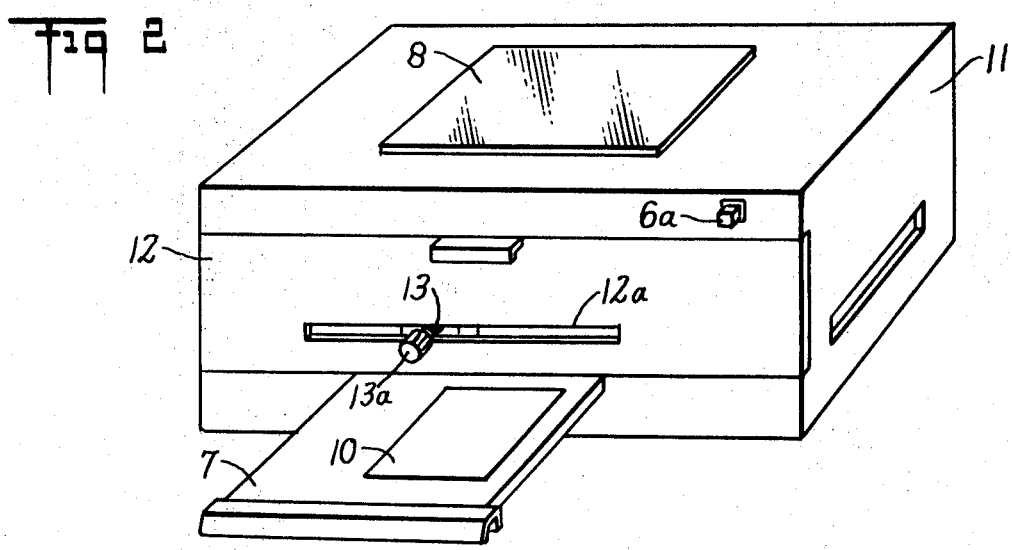
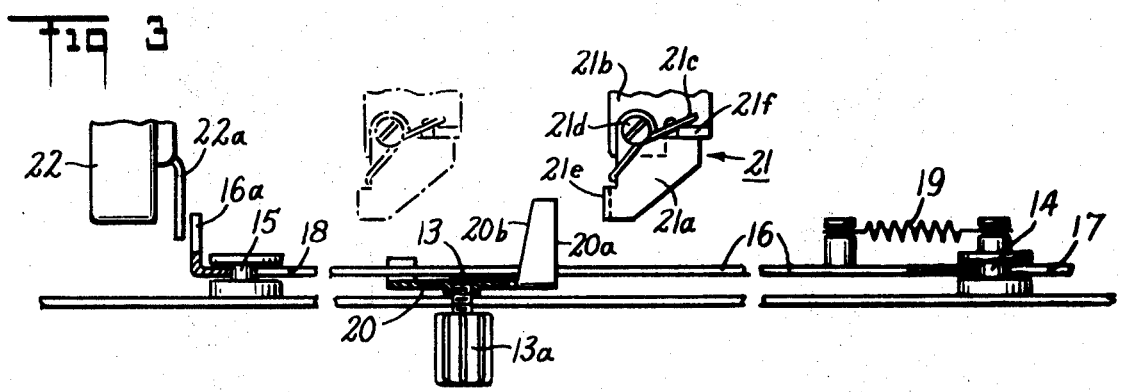
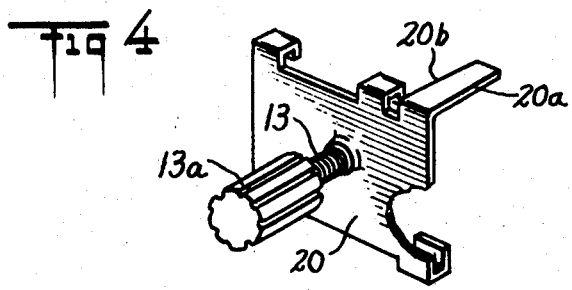
INVENTORS
Shigeru Suzuki
Toshio Watanabe
BY
Burgess, Ryan & Hicks
ATTORNEYS 3,609,032

DEVICE FOR LIMITING MOVEMENT RANGE OF A MOVABLE EXPOSURE MEANS IN A COPYING MACHINE

The invention is concerned with a device to limit the movement of a movable exposure unit in a copying machine.

The original to be copied is placed on a top surface of the machine. The copy sheet which may vary in size is placed on a projecting table element that can be pushed into the machine for copying. In order to accommodate the various sizes of copy sheet a manually adjustable positioning member is provided to be locked in position to correspond with the edge of the copy sheet. This positioning member is thereby attached to movable member adapted to actuate a microswitch when contacted by a collidable member attached to a movable exposure unit that scans the original. The collidable member includes a pivotal contacting piece so that if the collidable member is out of position with the positioning member, the contacting piece can pivot to pass over the collidable member to the proper position.

BRIEF DESCRIPTION OF THE ACCOMPANYING DRAWINGS

FIG. 1 is a schematic section view of an exposure means in a copying machine embodying the present invention;

FIG. 2 is a perspective view of a copying machine incorporating an embodiment of this invention;

FIG. 3 is a plan view of a movement range limiting device for a movable exposure means in a copying machine, illustrating an embodiment of this invention;

FIG. 4 is a perspective view of a position determining member in an embodiment shown in FIG. 3, with other parts omitted.

DETAILED DESCRIPTION OF THIS INVENTION

A movable means for projecting, by way of exposure with a light source, an image on an original document on to a light-sensitive copy sheet, or a so-called movable exposure means for a copying machine, is well known in the art.

The present invention relates to a device which is designed to turn off the light of an illumination tube in such movable exposure means in accordance with the size of a light-sensitive copy sheet as soon as exposure of said copy sheet is completed with the reciprocal movement of said movable exposure means and to ensure instant return movement of said movable exposure means to its original stationary position, thereby enabling to control the movement of such movable exposure means to exactly desired range.

A mechanism for returning a reciprocably movable exposure means, whereby said movable exposure means is adapted to travel from one end of a copying machine to the other irrespective of the size of a copy sheet, is already known. A copying machine with such mechanism, however, has many drawbacks; such as, waste of time and electricity, and low efficiency in copying operation.

On the other hand, attempts heretofore known to return electrically a movable exposure means to its original position in accordance with the size of the copy sheet used have proven to require a complex mechanism. Such complexity has caused easy break down of the mechanism, rather than attaining desired functions, which, in turn, have almost resulted in offsetting the advantages of a copying machine.

The primary objective of the present invention is to provide a practically feasible means of a simple mechanism for controlling movement range of an exposure means in a copying machine, whereby accurate return of said exposure means to its original position will always be ensured regardless of the size of a copy sheet used.

Another objective of this invention is to do away with the aforesaid waste incidental with the known mechanism, thereby enhancing the operational efficiency.

Other objectives and advantages of the present invention will become apparent when the following description of the embodiment is read in connection with the accompanying drawings.

Referring to FIG. 1, 1 represents a reflecting mirror. 2 is a lens. 3a and 3b illustrate tablet-shape reflecting mirrors. 4 shows an illumination light tube and 5, a slit window for passing the light. A movable exposure means 6 having an optical system consisting mainly of the aforesaid components is adapted to make a reciprocal movement within a space provided between a copy sheet table 7 and a corresponding transparent platform 8 for an original document. In the course of this reciprocal movement of the movable exposure means, an image on an original document 9 placed on said platform 8 is projected to a light-sensitive copy sheet 10 and thus the copy sheet is exposed.

The movement of the exposure means 6 from its original stationary position, or from the right end towards the left in the drawing, is activated by pressing a button 6a (Refer FIG. 2) provided at the upper portion of the copying machine. As the exposure means 6 nears the left end of the copy sheet shown in the drawing after exposing the later, the light of the illumination tube 4 is turned off the exposure means 6 is brought back to its original position by the motion of a mechanism hereinbelow described.

Referring now to FIG. 2, a copying machine 11 carrying various means and mechanism as shown in FIG. 1 has a front panel which is provided with a slot 12a fitted with a slidable screw rod 13. The inner ends of said front panel 12 are fixed, as shown in FIG. 3, with a pair of axes 14 and 15 which are respectively loosely fitted in slots 17 and 18 provided on both ends of a movable member 16. Said movable member 16 is long sideways and supported by said axes 14 and 15. The axis 14 has a spring 19 fixed thereto which is adapted to pull said movable member 16 in the direction of the right facing the drawing. The aforesaid screw rod 13 is screwed to a position determining member 20 which is slidably mounted on said movable member 16 and which is made freely slidable thereon upon loosening of said screw rod 13.

The upper and lower ends of said position determining member 20 are bent, as shown in FIG. 4, to loosely engage with aforesaid movable member 16 so as to provide a sliding movement. The upper bent end 20a of said position determining member 20 is arranged such that it is adapted to be pushed by a downwardly bent portion 21e of a collidable piece 21a mounted on the left side of the aforesaid movable exposure means 6 shown in FIG. 1 as said exposure means 6 makes a forwarding movement.

Now, after the copy sheet table 7 is pulled forward and a copy sheet 10 is placed thereon, the screw rod 13a thereof is aligned to the left edge of said copy sheet 10 and the fixed at the same position, whereby aforesaid position determining member 20 is fixed to the movable member 16. The copy sheet table 7 with the copy sheet 10 thereon is against pushed back into the copying machine. By pressing the button a a after an original document is placed on the original document mountable platform 8, the movable exposure means 6 is activated and the copy sheet 10 is exposed. As the exposure means 6 moves leftward in FIG. 1 and comes to the left end of the copy sheet, exposure of the copy sheet is completed. Concurrently, the collidable piece 21a of an engagement mechanism 21 is adapted to press the engagement end 20a, whereby the movable member 16 is pushed leftwards in FIG. 3 against the force of the spring 19. Subsequently. The bent portion 16a of said movable member 16 is adapted to move, at its left end, an activating piece 22a of a microswitch provided at a left end portion of the copying machine 11. As the microswitch 22 constitutes a circuit switch for reversing the driving motion of a driving mechanism for the aforesaid exposure means and turning off the light of the illumination tube 4, the exposure means 6 is adapted to make a return movement with the light off instantly with the completion of exposure of the copy sheet and returns to the original stationary position which is in the right end in FIG. 1.

The aforesaid engagement mechanism 21 provided at the forward end of the movable exposure means 6 consists, as shown in FIG. 3, of a collidable piece 21a, an arm member 21b which is loosely mounted, at one end with said collidable piece 21a and fixed, at the other end, to the exposure means 6, and a spring 21c which provides said collidable piece 21a with a bias to be constantly pressed, at one portion thereof, to a bent portion 21f of said arm member 21b. If the relative positions of the movable exposure means 6 and the knob 13a becomes misaligned in the course of opening and closing, for some reason or other, such as refilling the developer solution, of the front panel 12, such as shown in FIG. 3, in which the position of the engagement mechanism 21 is shown in a dotted line, the exposure means 6 moves leftward by the actuation of the button 6a and returns towards the right as the collidable piece 21a pushes the bent portion 16a. In this instance, although the collidable piece 21a presses, at the rear surface of its bent portion 21e, the opposite end 20b of the engagement end 20, the collidable piece 21a is adapted to rotate clockwise around axis 21d against the force of the spring 21c, which enables return movement of the exposure means 6 to its original position without any resistant force. As the pressure of the engagement end 20 is removed, the collidable piece 21a is pressed to the arm member 21b by the force of the spring 21c. The rotatability of the collidable piece 21a as described above helps prevent the movable exposure means 6 from being damaged by colliding with the fixed position determining means.

The mounting position of the collidable piece 21a of the engagement mechanism to be provided with the movable exposure means may not necessarily be in the forward end of the exposure means, so long as the relative 49 positions of said collidable piece 21a and the engagement end 20a of the position determining member 20 movable with the screw rod 13 are so arranged that the movement of the exposure means is accurately reversed with respect to the end of the copy sheet to be exposed.

According to the device for limiting the movement range of a movable exposure means embodying this invention, which consists of an engagement mechanism provided with a movable exposure means, and movable member which is adapted to moved by a collidable piece of said engagement mechanism and further transmit the motion thereof to a microswitch, waste of electricity and time required for copying operation is eliminated by instant return movement of an exposure means with the light off upon completion of exposure of a copy sheet irrespective of the size of the copy sheet to be used, ensuring improvement of copying efficiency.

Furthermore, because of a collidable piece oscillatable in one direction only and operable effectively with a position determining means only when a movable exposure means is making a forward movement, safety of the movement range limiting device is ensured irrespective of relative positions of a movable exposure means and its cooperating position determining means.

We claim:

1. A device for limiting the range of movement of a reciprocable exposure means in a copying machine comprising a housing having a front panel and within which an original is positioned for copying;

a slot formed in said front panel;

table means projecting out from said front panel on which the copy sheet is located to be slidable into the machine for copying;

slidable locking means located within said slot;

an elongated member positioned within the machine adjacent said front surface and being longitudinally movable;

a positioning member located within the machine and positioned between said front surface and said elongated member, said positioning member and said elongated member being selectively locked together together by said locking means;

a collidable member attached to said exposure means for movement therewith;

a power source and electrical circuit including a microswitch that is actuable to provide the return for the exposure means reciprocal movement; and said collidable member positioned within the machine to move and contact said positioning member whereby the resulting movement of said elongated member contacts and actuates the microswitch.

2. A device according to claim 1 in which said positioning member includes top and bottom edges having hook-over portions to fit over the top and bottom edges of said elongated member, and said positioning member further includes an upper projecting portion that is contacted by said collidable member.

3. A device according to claim 2 in which said collidable member includes a pivotal portion having a spring bias for return to a predetermined position after pivotal movement, said pivotal portion adapted to contact one side of said projecting portion for the movement to actuate said microswitch, and said pivotal portion being pivotal to pass around said projecting portion after contacting the other side of said projecting portion.